UNITED STATES PATENT OFFICE.

FREDERICK SIEMENS, OF DRESDEN, GERMANY.

IMPROVEMENT IN THE MANUFACTURE OF TOUGHENED ENAMELED GLASS.

Specification forming part of Letters Patent No. 205,981, dated July 16, 1878; application filed February 18, 1878; patented in England, May 30, 1877.

*To all whom it may concern:*

Be it known that I, FREDERICK SIEMENS, of Dresden, in the German Empire, have invented an Improvement in the Manufacture of Enameled Glass; and do hereby declare that the following description forms a full and exact specification of the same, wherein I have set forth the nature and principles of my said improvement, by which my invention may be distinguished from others of a similar class, together with such parts as I claim and desire to secure by Letters Patent—that is to say:

My invention relates to a new combined process whereby glass is provided with a coating of enamel, and is at the same time toughened or hardened by means of the process described in my United States Patent dated 26th of June, 1877.

By means of my said improved process enameled toughened glass is produced having a coating of enamel, which may either be plain or ornamented according to any desired design, and which adheres to the glass so firmly as to withstand all ordinary usages, and which can only be removed by grinding.

For this purpose I apply to the glass a powder of glass or enamel, white or colored; or I suspend this powder in a fluid-vehicle, and paint it or print it on the glass according to the desired design; or the glass may first be coated with liquid enamel, and then have enamel in the form of powder applied thereto; or I apply the enamel powder or paint by stencil-plates having the design cut in them; or, having coated the whole surface with enamel, I apply a thin stencil-plate and brush, or wipe off such portions of the powder or paint as present themselves through the openings of the plate, thus leaving on the glass the portions of enamel that are protected by the metal of the plate; or, according to another method, I paint, print, or stencil the enamel on paper, which I paste on the glass. I then toughen the glass having on its surface the enamel, which thus becomes incorporated with the glass.

The toughening or hardening may be effected by any of the known methods, such as first heating and then plunging the glass into liquid at a lower temperature. I prefer, however, to effect the hardening or toughening of the glass by the process described in the before-mentioned specification of patent, granted to me on the 26th of June, 1877.

Glass thus treated presents a surface indelibly coated with enamel all over it, or partially over it, according to any desired design.

The method which I prefer to employ for ornamenting glass according to my invention is to coat the article with a fluid enamel, which is allowed to dry, after which the desired pattern to be produced on the glass is cut out in thin sheet-copper, which is placed on the enamel surface, so as to allow the enamel coating on those parts of the glass not covered by the stencil-plate to be removed by a brush. Thus the glass will receive a pattern corresponding with that of the stencil-plate by having the surface or ground surrounding the pattern coated with enamel. The glass so prepared is then heated in a furnace to the degree required for the toughening process, such degree varying according to the quality of the glass or to the special toughening process to which it is to be subjected; and it is to be understood that the enamel must be prepared of such ingredients as are suited for producing a properly-vitrified enamel, adhering firmly to the glass when subjected to the particular temperature and duration of heating required for such toughening process. The glass is then toughened by any known process, but, as before stated, by preference, by the processs previously patented by me.

The photographic process may also be employed in my before-described mode of ornamenting the glass by transferring the desired design or picture onto it in the same manner employed in ordinary photography, to be afterward painted over with liquid enamel; or I produce the photographic copy direct on the glass to be ornamented, and then generate or bring out the design by means of enamel-powder.

I do not claim, broadly, the means of fixing an enamel upon glass by means of heat; nor do I claim, in this case, the mode of toughening; but by combining the two processes, substantially as above described, a new result is obtained.

Having thus described the nature of the said invention, and in what manner the same is to be performed, I claim, as an improvement on the process described in my United States patent dated June 26, 1877—

1. The method, substantially as herein described, of producing enameled toughened glass by applying to glass a coating of enamel, and then securing the same thereon by a toughening or hardening process.

2. As a new article of manufacture, toughened or hardened glass coated with enamel.

In testimony whereof I have signed my name to this specification in the presence of two subscribing witnesses this 2d day of February, 1878.

FREDERICK SIEMENS.

Witnesses:
  MAX SCHULZ,
  C. MAX HERRMANN.